(12) United States Patent
Lavene et al.

(10) Patent No.: US 7,471,498 B2
(45) Date of Patent: Dec. 30, 2008

(54) WOUND CAPACITOR HAVING A THERMAL DISCONNECT AT A HOT SPOT

(75) Inventors: Bernard Lavene, Ocean, NJ (US);
David Curto, Toms River, NJ (US);
Alan Schach, Forked River, NJ (US)

(73) Assignee: Electronic Concepts, Inc., Eatontown, NJ (US)

( * ) Notice: Subject to any disclaimer, the term of this patent is extended or adjusted under 35 U.S.C. 154(b) by 0 days.

(21) Appl. No.: 11/717,328

(22) Filed: Mar. 13, 2007

(65) Prior Publication Data
US 2007/0217124 A1    Sep. 20, 2007

Related U.S. Application Data

(60) Provisional application No. 60/782,469, filed on Mar. 15, 2006.

(51) Int. Cl.
*H01G 2/14* (2006.01)
*H01G 2/00* (2006.01)

(52) U.S. Cl. .................. 361/274.1; 361/272; 361/275.4
(58) Field of Classification Search ................ 361/518, 361/272, 274.1, 275.4, 534
See application file for complete search history.

(56) References Cited

U.S. PATENT DOCUMENTS

| | | | |
|---|---|---|---|
| 3,046,374 A * | 7/1962 | Wright | .................. 337/185 |
| 3,236,976 A | 2/1966 | Rayno | |
| 3,396,319 A * | 8/1968 | Robinson | .................. 361/275.4 |
| 4,184,139 A | 1/1980 | Hara | |
| 4,378,620 A | 4/1983 | Lavene | |
| 4,422,127 A | 12/1983 | Lavene | |
| 4,455,591 A | 6/1984 | Lavene | |
| 4,470,097 A | 9/1984 | Lavene | |
| 4,516,187 A | 5/1985 | Lavene | |
| 4,538,205 A | 8/1985 | Lavene | |

(Continued)

FOREIGN PATENT DOCUMENTS

WO    WO 2007/109061 A2    9/2007

OTHER PUBLICATIONS

International Search Report, Appln. No. PCT/US07/06456 dated Mar. 15, 2007.

*Primary Examiner*—Eric Thomas
*Assistant Examiner*—David M Sinclair
(74) *Attorney, Agent, or Firm*—RatnerPrestia

(57) ABSTRACT

A capacitor having a large current carrying capacity includes a hollow core formed by a non-conducting tubular section, and a capacitor winding wrapped around the tubular section. A thermal cutoff device is disposed within the hollow core. The thermal cutoff device is configured to sense a predetermined temperature level within the hollow core and disable the current carrying capacity of the capacitor. The thermal cutoff device is disposed at a geometric center of the capacitor winding, which is also the hot spot of the capacitor winding. The thermal cutoff device includes first and second conductors electrically connected to each other with a predetermined solder alloy. The first conductor includes a cross-sectional portion that is attached to the second conductor. The cross-sectional portion is subjected to a springing force in a lateral direction away from the second conductor. Upon melting of the solder alloy, the springing force moves the cross-sectional portion away from the second conductor, thereby disabling the current carrying capacity of the capacitor.

15 Claims, 6 Drawing Sheets

U.S. PATENT DOCUMENTS

| | | | |
|---|---|---|---|
| 4,547,832 A | 10/1985 | Lavene | |
| 4,603,373 A | 7/1986 | Lavene | |
| 4,614,995 A | 9/1986 | Lavene | |
| 4,633,365 A * | 12/1986 | Stockman | 361/272 |
| 4,635,163 A * | 1/1987 | Voglaire | 361/275.4 |
| 4,685,026 A | 8/1987 | Lavene | |
| 4,719,539 A | 1/1988 | Lavene | |
| 4,791,529 A * | 12/1988 | Duncan et al. | 361/274.1 |
| 4,980,798 A | 12/1990 | Lavene | |
| 5,032,950 A | 7/1991 | Lavene | |
| 5,371,650 A | 12/1994 | Lavene | |
| 5,493,472 A | 2/1996 | Lavene | |
| 5,608,600 A | 3/1997 | Lavene | |
| 5,610,796 A | 3/1997 | Lavene | |
| 5,614,111 A | 3/1997 | Lavene | |
| 5,638,250 A | 6/1997 | Oravala | |
| 5,770,993 A * | 6/1998 | Miyazawa et al. | 337/160 |
| 6,111,743 A | 8/2000 | Lavene | |
| 2001/0012732 A1 * | 8/2001 | Kitchens | 439/622 |
| 2001/0014005 A1 | 8/2001 | Nakamura | |

\* cited by examiner

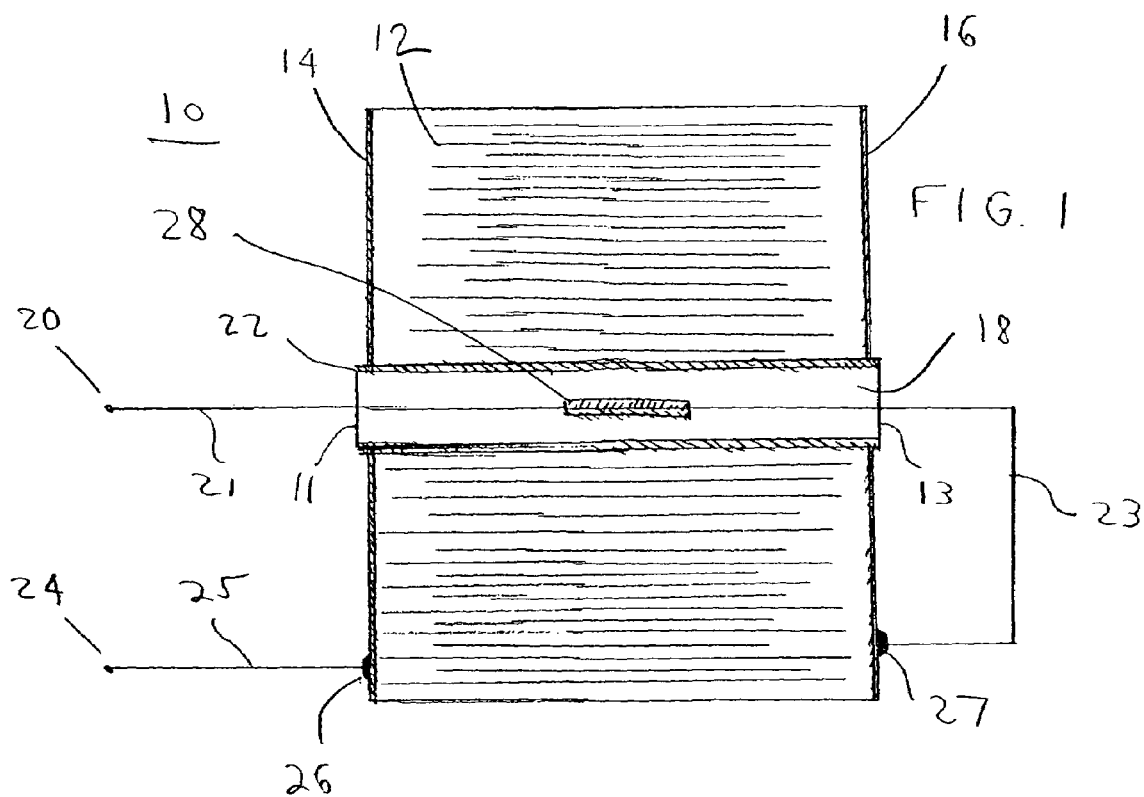
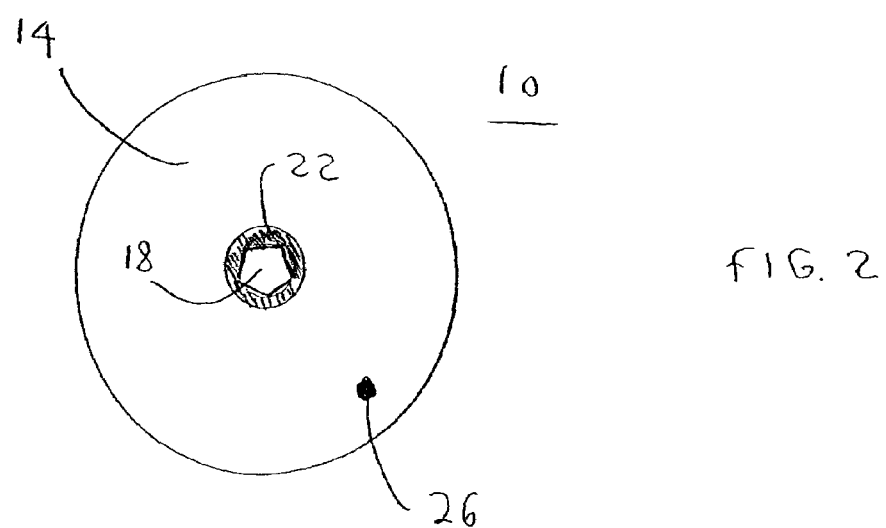

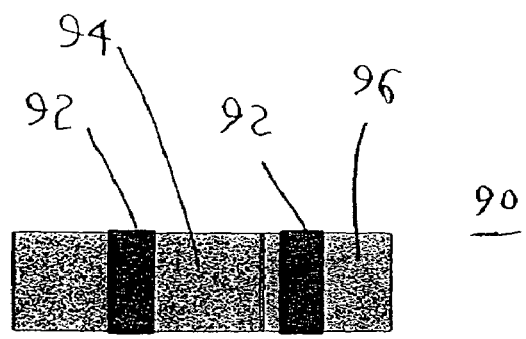
FIG. 9A
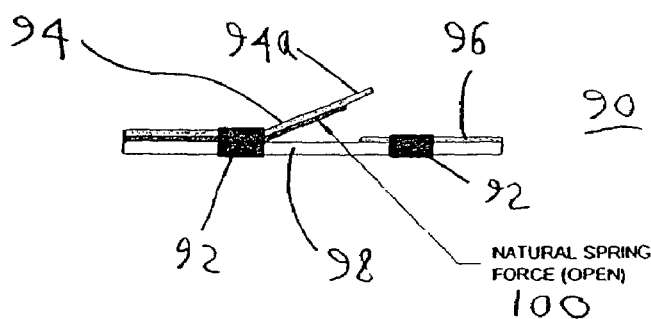
FIG. 9B
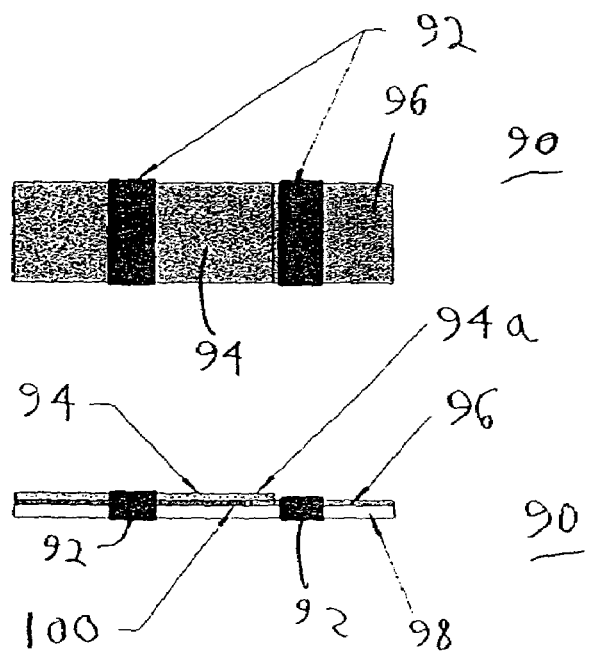
FIG. 10A
FIG. 10B

WOUND CAPACITOR HAVING A THERMAL DISCONNECT AT A HOT SPOT

CROSS REFERENCE TO RELATED APPLICATIONS

This application claims priority to U.S. Provisional Patent Application Ser. No. 60/782,469 filed Mar. 15, 2006.

TECHNICAL FIELD

The present invention relates, in general, to a wound metallized film capacitor. More specifically, the present invention relates to a wound film capacitor having a thermal disconnect device disposed at a hot spot of the capacitor.

BACKGROUND OF THE INVENTION

A standard metallized film capacitor widely known in the art is the wound capacitor. Wound capacitors are constructed by sandwiching a dielectric film such as polycarbonate, polypropylene or polyester film, between metal electrodes (e.g., vapor deposited metal film). Once formed, the combination dielectric/metal material is wound to form a capacitor. Some specific examples of wound capacitors are found in the following: U.S. Pat. No. 4,719,539 (Lavene), U.S. Pat. No. 4,685,026 (Lavene), and U.S. Pat. No. 5,614,111 (Lavene). Each of these U.S. patents are incorporated herein by reference.

The size of a capacitor is related to its breakdown voltage. The size of a metallized film capacitor is dictated by the thickness of its dielectric film. The thickness of the dielectric, in turn, is dictated by the required overall breakdown voltage of the capacitor. For instance, if a manufacturer cites a particular film as having a dielectric strength of 200 volts/micron and the capacitor design calls for a dielectric breakdown voltage of 400 volts, then the film may be 2 microns thick. Thus, the breakdown voltage of a capacitor depends on the dielectric strength and the thickness of the film.

When electrical current is passed through a wound film capacitor, thermal energy is generated raising the temperature of the capacitor. In large current applications (for example 7 amperes to 30 amperes), this thermal energy can be quite large and may lead to the deterioration of the capacitor. In some applications the thermal energy may even lead to an explosion.

Additionally, thermal energy may be increased if the capacitor is hermetically sealed, because the hermetic sealing may make it more difficult for the heat to be transferred to the exterior of the capacitor and be dissipated. It is known to place metal cover seals at the opposite ends of hermetically sealed capacitors, thereby increasing somewhat the transfer of thermal energy to the exterior of the capacitor. It is also known to provide perforations in these cover seals. The perforations permit outgassing to occur, when the capacitor is baked prior to sealing, thereby cleaning and drying the capacitor.

It is known to provide fault interrupters to prevent capacitors from overheating or exploding. U.S. Pat. No. 3,496,432 discloses a wound capacitor which forms gas when being overheated. The dielectric of the capacitor winding includes a foil of thermoplastic material with the property of contracting when heated. Thus, when the capacitor winding, upon heating, contracts in the axial direction, one of the metal layers is separated from the capacitor winding, so that electrical connection to the capacitor winding is interrupted.

U.S. Pat. No. 4,639,827 discloses a pressure sensitive fault interrupter for a film capacitor. The film capacitor has a dome-shaped diaphragm. When a fault occurs, pressure is developed within the capacitor as a result of the breakdown of the dielectric, thereby producing various gases. These gases fill the core of the capacitor and exert downward pressure on the diaphragm. The downward pressure changes the concave shape of the diaphragm into a convex shape, thereby breaking the electrical contact between the film capacitor and one of its tabs.

The present invention includes a fault interrupter (also referred to herein as a fuse or a thermal cutoff device) for a wound film capacitor which is different from any of the prior art, as described below.

SUMMARY OF THE INVENTION

To meet this and other needs, and in view of its purposes, the present invention provides a capacitor having a large current carrying capacity including (a) a hollow core formed by a non-conducting tubular section, (b) a capacitor winding wrapped around the tubular section, and (c) a thermal cutoff device disposed within the hollow core. The thermal cutoff device is configured to sense a predetermined temperature level within the hollow core and disable the current carrying capacity of the capacitor. The thermal cutoff device is disposed at a geometric center of the capacitor winding. The thermal cutoff device is also disposed at a hot spot of the capacitor winding, the hot spot defined as a location of a high thermal energy, or high temperature level within the capacitor winding. The hot spot may also be at a location of the highest thermal energy, or highest temperature level within the capacitor winding.

The thermal cutoff device includes first and second conductors electrically connected to each other with a predetermined solder alloy. The predetermined solder alloy includes a composition of one or more substances, where the substances are selected in proportion to each other for causing the solder alloy to melt at the predetermined temperature level.

The first conductor includes a cross-sectional portion which is attached to the second conductor, and the cross-sectional portion is subjected to a springing force in a lateral direction away from the second conductor. The solder alloy includes a composition of one or more substances selected to melt at the predetermined temperature level. Upon melting of the solder alloy, the springing force moves the cross-sectional portion away from the second conductor.

The capacitor winding includes a metallized film that is wound around the tubular section and metallic opposing ends that are coupled to respective ends of the metallized film. The first and second conductors are coupled to respective wire leads. One of the wire leads is connected, at a location external to the hollow core, to one of the metallic opposing ends, and the other wire lead is extended beyond the hollow core for attachment to a terminal. Lengths of the respective wire leads are adjusted to place the thermal cutoff device at the geometric center of the capacitor winding.

The thermal cutoff device includes a non-conducting base for fastening the first and second conductors thereon. The first conductor includes a rest state occurring after being subjected to the springing force in the lateral direction away from the second conductor. The cross-sectional portion forms an angle of A degrees with respect to the second conductor during the rest state, and the angle A is selected based on a desired level of the springing force.

Another embodiment of the present invention is a method for thermally protecting a large current carrying capacitor. The method includes the steps of: (a) wrapping a capacitor winding around a non-conducting tubular section to form a hollow core; (b) sensing a predetermined temperature level within the hollow core, using a thermal cutoff device; and (c) disabling current flow in the capacitor upon sensing the predetermined temperature level. Step (b) includes sensing the temperature level at a geometric center of the capacitor winding. Sensing the temperature level includes sensing a hot spot of the capacitor winding, the hot spot being the hottest spot of the capacitor winding. Step (b) includes placing the thermal cutoff device at a geometric center of the capacitor winding.

The method also includes the step of connecting first and second conductors using a solder alloy composition to form the thermal cutoff device; and step (b) includes sensing the temperature level based on a melting temperature of the solder alloy composition. The method further includes the step of bending one end portion of the first conductor in a direction away from the second conductor, prior to connecting the first and second conductors with the solder alloy composition. Step (c) includes moving the one end portion of the first conductor away from the second conductor, upon sensing of the temperature level based on the melting of the solder alloy composition.

It is understood that the foregoing general description and the following detailed description are exemplary, but are not restrictive, of the invention.

BRIEF DESCRIPTION OF THE DRAWING

The invention is best understood from the following detailed description when read in connection with the accompany drawings. Included in the drawings are the following figures:

FIG. 1 is a cross sectional view of a wound film capacitor including a thermal cutoff device in accordance with an embodiment of the present invention;

FIG. 2 is a side view of the wound film capacitor shown in FIG. 1, with the thermal cutoff device having been removed;

FIGS. 9A and 9B show another embodiment of the thermal cutoff device of FIG. 1, including two conductors, one conductor disposed on a non-conducting base and the other conductor disposed on a spring, which are in an open state or a rest state, in accordance with an embodiment of the present invention; and FIGS. 10A and 10B show the thermal cutoff device of FIGS. 9A and 9B in a closed state or a non-resting state, in accordance with another embodiment of the present invention.

DETAILED DESCRIPTION OF THE INVENTION

Figure 3:
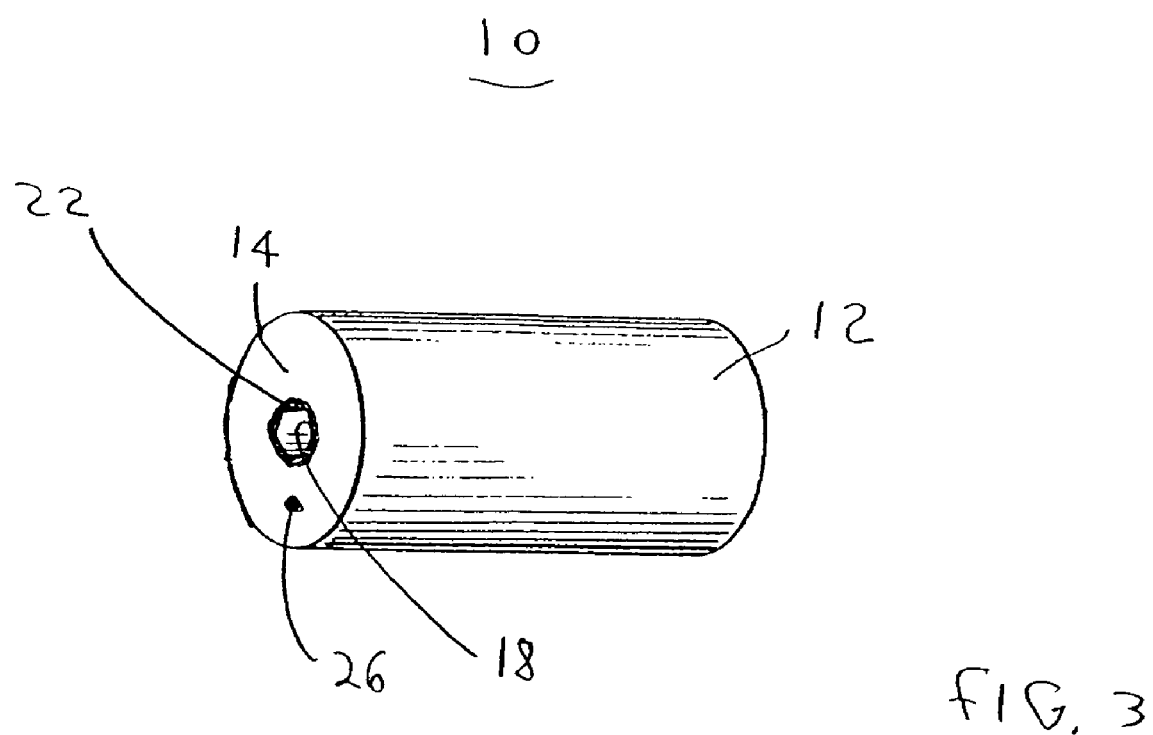
FIG. 3 is a perspective view of the wound film capacitor shown in FIG. 1, with the thermal cutoff device having been removed.

Referring now to the FIGS. 1, 2 and 3 there is shown a high current carrying capacitor, generally designated as 10. Capacitor 10 includes hollow core 18 surrounded by capacitor winding 12, whereby thermal energy produced within capacitor winding 12, resulting from electrical current passing through winding 12, is transmitted to hollow core 18. As shown, hollow core 18 is formed by non-conducting tubular section 22 which extends slightly beyond the ends of capacitor winding 12 and includes thermal energy from capacitor winding 12. At opposite ends of capacitor winding 12 are two metallization layers 14 and 16.

It will be appreciated that on completion of winding 12 of the capacitor roll, the ends of capacitor winding 12 may be sprayed with a high velocity mixture of compressed air and molten fine particles of tin produced from an electric arc gun. This spray forms opposing metallization layers 14 and 16, which may be considered electrically the same as opposing first and second terminals of the capacitor. In conventional manner, wire leads 23 and 25 may then each be bonded to respective metallization layers 16 and 14 by way of solder terminals 26 and 27. Metallization layers 14 and 16, positioned at opposite ends of the capacitor roll, completely encircle the outer circumferences of the capacitor roll.

Capacitor winding 12 is wound around tubular section 22 in conventional fashion. Hollow core 18 may be trimmed to extend approximately 0.2 to 0.3 inches beyond metallization layers 14 and 16, thereby forming core extensions or collars 11 and 13. The core extensions, however, are not necessary to the present invention.

As best shown in FIG. 2, tubular section 22 includes an inner hexagonal surface forming the hollow core. This inner surface may be used for anchoring the tubular section to a winding machine. The tubular section is then used as a mandrel for winding the film capacitor into a roll. It will be understood that although FIG. 2 shows a hexagonal cross-section forming the inner surface, any other geometric cross-section may also be used. The cross-section of the inner surface, for example, may be circular, triangular, pentagonal, etc.

For reasons that will be explained, fuse 28 together with wire leads 21 and 23 are inserted into hollow core 18. As shown, fuse 28 is in a closed position (also referred to herein as a closed state or a non-resting state) which permits electrical current to flow from wire lead 21 to wire lead 23. In turn, electrical current may flow from wire lead 23 to metallization layer 16 and into a first end metallic winding of capacitor 10 by way of solder terminal 27. Furthermore, electrical current may flow from a second end metallic winding of capacitor 10 to wire lead 25 by way of metallization layer 14 and solder terminal 26. In this manner, when fuse 28 is in a closed position (as shown in FIG. 1), capacitor 10 permits a charge of current to flow between terminals 20 and 24.

It will be understood that fuse 28 is also referred to herein as a thermal cutoff device 28. It will further be understood that the wire leads and fuse 28 have been omitted from FIGS. 2 and 3 for purposes of clarity. It will also be understood that wire leads 21, 23 and 25 each includes an insulation layer so that accidental electrical shorts do not occur between the wire leads and metallization layers 14 or 16.

Tubular section 22 may be formed of a non-conductive material, such as polypropylene. Tubular section 22 forms a continuous passageway, referred to herein as hollow core 18, through the entire length of hollow core 18. As an example, the diameter of hollow core 18 may be approximately 1/8 of an inch.

When electric current is passed through capacitor winding 12, thermal energy is generated raising the temperature of capacitor winding 12. The inventors discovered that the hottest region of capacitor winding 12 is at its geometric center. The geometric center includes the region containing tubular section 22 and is located at the radial center and the axial center of the hollow core. Thus, hollow core 18 passes directly through the region containing the highest temperature within capacitor winding 12. This region is also referred to herein as the hot spot of the capacitor winding.

The hollow core is effective in conducting thermal energy from the capacitor winding to the exterior of capacitor 10. This permits capacitor 10 to carry higher electrical current without deterioration due to excessive heat. It is believed that the geometric center of capacitor 10 does not experience a temperature rise in excess of 20° C. above ambient temperature, because hollow core 18 transfers thermal energy to the exterior of the capacitor.

Capacitor 10 with hollow core 18 may safely handle electrical current an order of magnitude higher than a similar capacitor without a hollow core, if air is circulated through hollow core 18, for example, by a fan (not shown). It is believed that if air is not circulated through hollow core 18, current capacity may still improve by a factor of 5 to 10 over a similar capacitor without hollow core 18.

In order to further protect capacitor 10, fuse 28 is inserted within hollow core 18. Since the geometric center of capacitor 10 is located at the center of gravity of capacitor winding 12, fuse 28 is disposed at the middle of the axial length of hollow core 18. In this manner, fuse 28 is susceptible to the highest temperature, or the hot spot of capacitor winding 12. As shown in FIG. 1, fuse 28 is suspended within hollow core 18, without the need to fasten the fuse to any portion of the tubular section. The fuse is centrally positioned within hollow core 18 with the aid of wire leads 21 and 23.

Fuse 28 (or thermal cutoff device 28) will now be described in greater detail. An exemplary embodiment of the fuse will now be described with reference to FIGS. 4A, 4B, 5A and 5B. The fuse, generally designated as 40, includes conductors 44 and 46 disposed on non-conducting base 42. Conductor 44 is bent upward away from conductor 46, thereby forming an angle A with respect to conductor 46. The bent region of conductor 44 forms a plane of length L and width W. Conductors 44 and 46 may be formed from beryllium cooper.

Figure 4A:
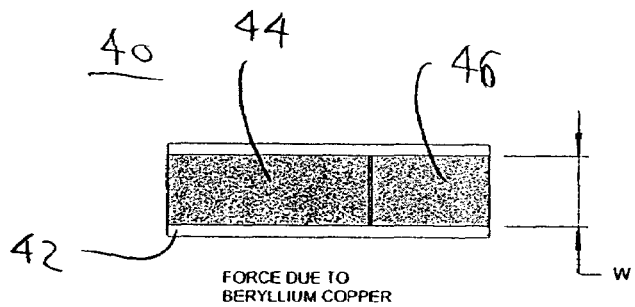
FIGS. 4A and 4B show an embodiment of the thermal cutoff device of FIG. 1, including two conductors disposed on a non-conducting base which are in an open state or a rest state, in accordance with an embodiment of the present invention.
Figure 4B:
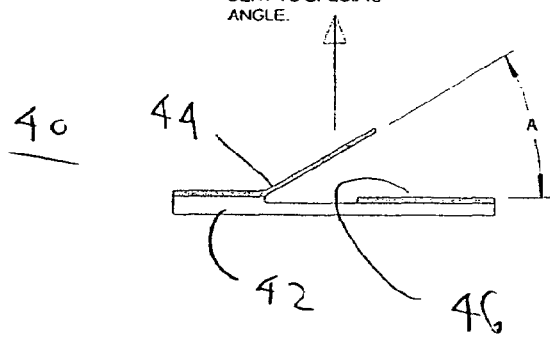

FIGS. 4A and 4B show fuse 40 having conductor 44 positioned at a predetermined angle A with respect to conductor 46. In this position, fuse 40 is mechanically open and is also in a rest state. Accordingly, wire leads 21 and 23 (shown in FIG. 1) are electrically non-conducting or electrically open.

Figure 5A:
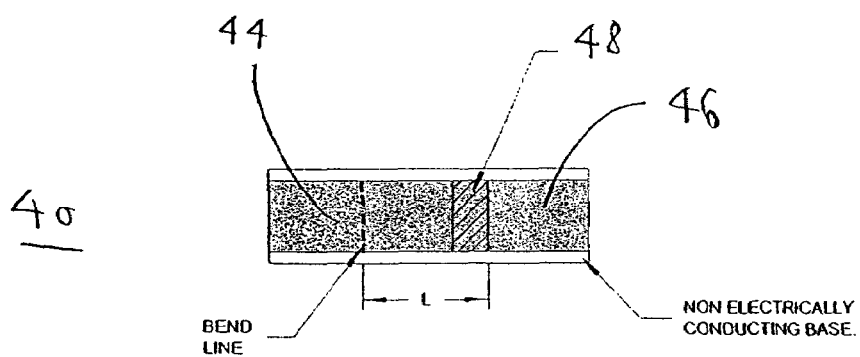
FIGS. 5A and 5B show the thermal cutoff device of FIGS. 4A and 4B in a closed state or a non-resting state, in accordance with an embodiment of the present invention.
Figure 5B:
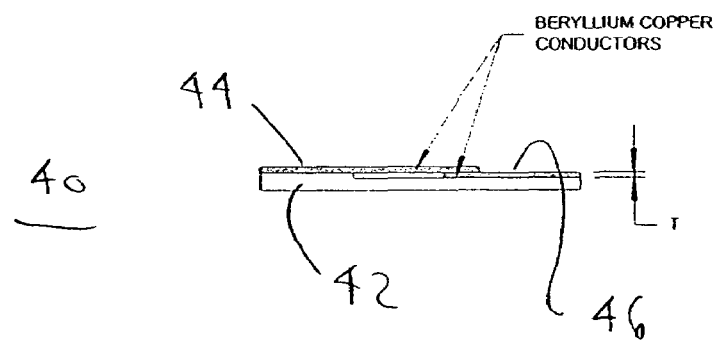

Fuse 40 is shown in a mechanically closed position in FIGS. 5A and 5B. As shown, conductor 44 has been pushed down toward conductor 46, thereby making electrical contact between conductors 44 and 46. It will be appreciated that cross-sectional area 48 represents an area where conductors 44 and 46 overlap. This overlapping area provides connection between the two conductors by using indium solder, for example, placed at the overlapping area. Once the solder solidifies to connect conductors 44 and 46, there exists a force tending to pull the two conductors apart. This force, or springing action, is due to the bend portion of conductor 44 and the angle A separating the two conductors during the resting state of the fuse. The angle A determines the level of force, or level of springing action used to move conductor 44 away from conductor 46, when the solder connection is broken due to melting of the solder.

In operation, fuse 40 (for example) is triggered for action by soldering its two conductors to form a closed position or form a non-resting state for the fuse. The soldered fuse is then placed within hollow core 18 using wire leads 21 and 23, as shown in FIG. 1. The fuse is centered at the hot spot of capacitor winding 12 by using a proper length for each of the wire leads. The wire leads are then anchored, one to metallization layer 16 by way of solder terminal 27 and the other to dry terminal 20.

Since fuse 40 (or fuse 28) is disposed at the hot spot of capacitor winding 12, the fuse senses the temperature level of the hot spot. The sensing is controlled by using a specific composition of a solder alloy to connect the conductors of the fuse. Upon reaching a melting temperature of the specific composition of solder alloy, the stored force between the two conductors (shown in FIG. 4B) forces conductor 44 to spring back to its rest position at angle A. This, in turn, causes fuse 40 (or fuse 28) to open and disable any current from flowing between terminals 20 and 24.

The table at the end of this application shows some physical properties of common solder wire alloy. As may be seen, the melting point of the solder is dependent upon the composition of the material used in the solder alloy. In this manner, the temperature level that causes the fuse to transition from a closed position (non-resting state) to an open position (resting state) may be controlled.

As shown in the table, the solder alloy transitions from a solid state to a liquid state at different temperatures depending on the composition of the alloy. For example, an alloy of solder which is made from a composition of 52% indium and 48% tin transitions from a solid state to a liquid state at a temperature of 118° C. Accordingly, by using the different physical properties of common solder wire alloys, the inventors advantageously achieve the sensing of different temperature levels to cause an open state in the fuse.

The following is provided as an example. Base 42 of FIGS. 4A, 4B, 5A and 5B may be made of a layer of epoxy and/or fiberglass, thereby forming a non-conducting material base. The width W of conductors 44 and 46 may be, for example, 0.150 inches. The width of base 42 may be slightly wider, for example 0.175 inches. The thickness T (shown in FIG. 5B) may be, for example, 0.125 inches. The length L between the bend line and the end of conductor 44 may be, for example, 0.575 inches. The width and thickness of conductors 44 and 46 may be determined based on the RMS value of electrical current needed for a specific capacitor design.

Figure 6:
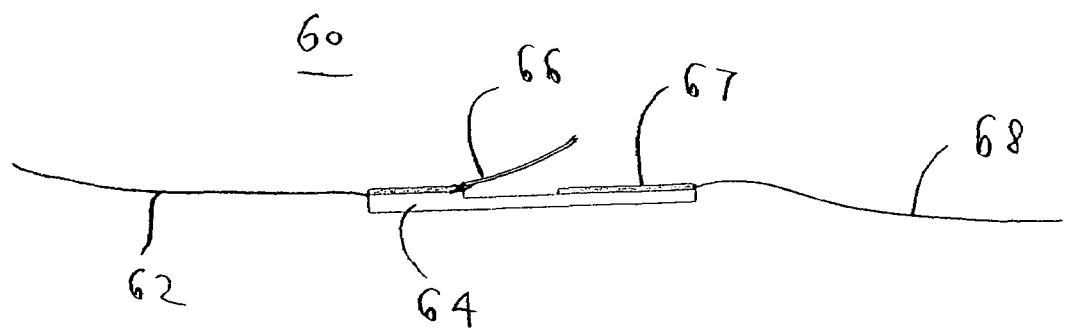
FIG. 6 shows another thermal cutoff device that includes a curved conductor end portion, which is different from the straight conductor end portion shown in FIG. 4B, in accordance with an embodiment of the present invention.

Referring next to FIG. 6, there is shown another exemplary embodiment of a thermal cutoff device (fuse), generally designated as 60. As shown, fuse 60 includes non-conducting base 64 and conductors 66 and 67, each positioned onto base 64. Also shown are wire leads 62 and 68, respectively, connected to conductor 66 and conductor 67. As shown, conductor 66 has approximately half of its conducting length bent upward in a curved manner. The curved line of conductor 66 shown in FIG. 6 is different from the straight bent line of conductor 44 shown in FIG. 4B.

It will be appreciated that the difference in the bending of the conductor (straight line versus a curved line) makes a difference in the amount of force stored in the bend conductor after soldering the bend conductor to its mating non-bend conductor. Different amount of force allows for different springing action to force the two conductors to separate away from each other, upon melting of the solder in cross sectional area 48 (FIG. 5A).

Figure 7:
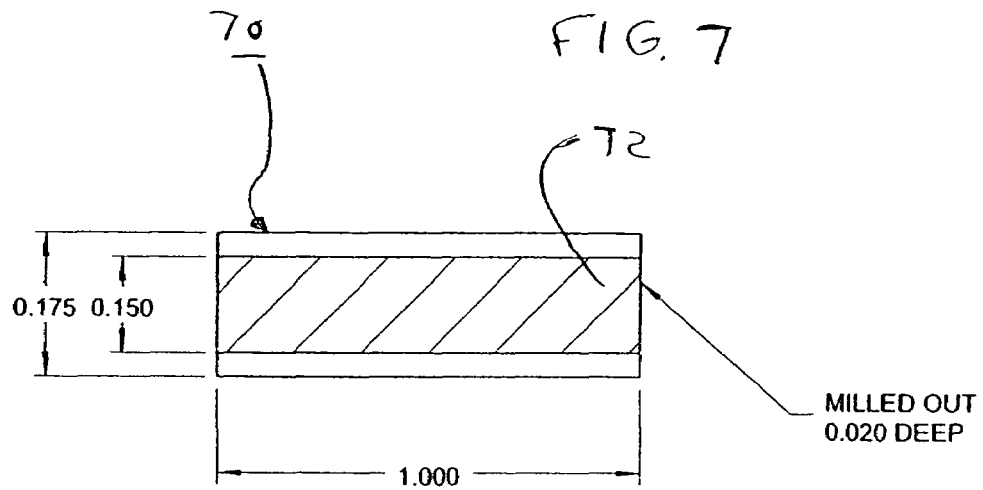
FIG. 7 shows a top view of a non-conducting base of a thermal cutoff device for receiving the two conductors (not shown), in accordance with an embodiment of the present invention.

Referring next to FIG. 7, there is shown an exemplary embodiment of a non-conducting base for holding the two conductors (not shown). The non-conducting base, generally designated as 70, is shown to have been milled to a depth of 0.020 inches. The width of milled portion 72 is 0.150 inches and the width of non-conducting base 70 is 0.175 inches. The length of non-conducting base 70 is 1.000 inches. The tabs of the two conductors (not shown) may be positioned within milled portion 72 of non-conducting base 70.

Figure 8:
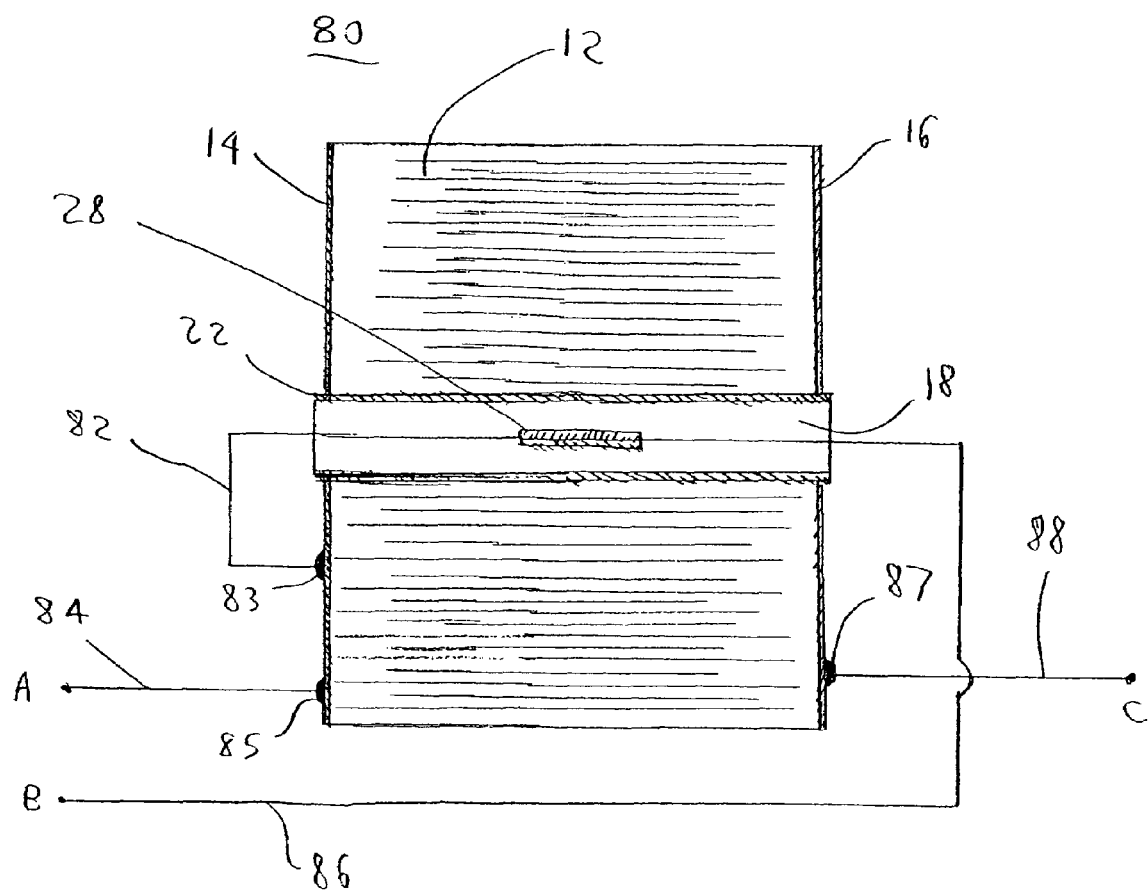
FIG. 8 is a cross sectional view of a wound film capacitor including a thermal cutoff device, in accordance with another embodiment of the present invention.

Referring next to FIG. 8, there is shown another embodiment of the present invention. As shown, capacitor 80 includes capacitor roll 12 which is wound around non-metallic tubular section 22. Tubular section 22 forms hollow core 18 in which fuse 28 (for example) is positioned at the hot spot of the capacitor with the aid of lead wires 82 and 86. Lead wire 82 is connected to solder terminal 83, the latter being disposed on conductive end 14 of capacitor roll 12. The other conductive end 16 of capacitor roll 12 includes solder terminal 87 which is connected to lead wire 88. Lead wire 86 is brought out from within hollow core 18 and connected to terminal B.

In the capacitor configuration of FIG. 8, three terminals may be formed exterior to capacitor 80. These terminals are shown designated as A, B and C. A user of capacitor 80 may use terminals A and B so that he may have the benefit of fuse 28 for providing a thermal cutoff at the hot spot of capacitor 80. On the other hand, if the user does not wish to use the thermal cutoff device, he may use terminals A and C of capacitor 80. In this latter configuration, capacitor 80 operates without benefit of the thermal cutoff device.

It will be appreciated that the capacitor configuration shown in FIG. 1 may be referred to as a radial capacitor. The capacitor configuration shown in FIG. 8 may be referred to as an axial capacitor.

FIGS. 9A and 9B show fuse 90 as yet another embodiment of the present invention. Fuse 90 includes conductor 94 positioned on top of spring 100 and conductor 96 disposed on non-conducting base 98. Spring 100 may be formed from beryllium copper, which is used as a spring only. In turn, spring 100 is disposed on non-conducting base 98. Clamps 92 are effective in fixing conductor 94, spring 100 and conductor 96 to the non-conducting base. In the position shown, fuse 90 is mechanically open and is also in a rest state. Accordingly, wire leads 21 and 23 (shown in FIG. 1) are electrically non-conducting or electrically open.

Fuse 90 is shown in a mechanically closed position in FIGS. 10A and 10B. As shown, conductor 94 has been pushed down toward conductor 96, thereby making electrical contact between conductors 94 and 96. Flexible conductor 94 extends beyond an end of spring 100, forming a cross-sectional area designated as 94a (FIGS. 9B and 10B). It will be appreciated that cross-sectional area 94a represents an area where conductors 94 and 96 are connected to each other. This overlapping area provides connection between the two conductors by using indium solder, for example, placed in the overlapping area. Once the solder solidifies to connect conductors 94 and 96, there exists a force tending to pull the two conductors apart. This force, or springing action, is due to the natural spring force of spring 100 and the angle A (shown in FIG. 4B) separating the two conductors during the resting state of the fuse. The angle A determines the level of force, or level of springing action used to move conductor 94 away from conductor 96, when the solder connection is broken due to melting of the solder.

In operation, fuse 90 (for example) is triggered for action by soldering its two conductors to form a closed position or form a non-resting state for the fuse. The soldered fuse is then placed within hollow core 18 using wire leads 21 and 23, as shown in FIG. 1. The fuse is centered at the hot spot of capacitor winding 12 by using a proper length for each of the wire leads. The wire leads are then anchored, one to metallization layer 16 by way of solder terminal 27 and the other to dry terminal 20.

Since fuse 90 (or fuse 28) is disposed at the hot spot of capacitor winding 12, the fuse senses the temperature level of the hot spot. The sensing is controlled by using a specific composition of a solder alloy to connect the conductors of the fuse. Upon reaching a melting temperature of the specific composition of solder alloy, the stored force between the two conductors due to spring 100 (shown in FIG. 9B) forces conductor 94 to spring back to its rest position at angle A. This, in turn, causes fuse 90 (or fuse 28) to open and disable any current from flowing between terminals 20 and 24.

The table enclosed at the end of this application, which shows some physical properties of common solder wire alloy, also applies to the embodiment shown in FIGS. 10A and 10B. As may be seen, the melting point of the solder is dependent upon the composition of the material used in the solder alloy. In this manner, the temperature level that causes the fuse to transition from a closed position (non-resting state) to an open position (resting state) may be controlled.

As shown in the table, and previously described, the solder alloy transitions from a solid state to a liquid state at different temperatures depending on the composition of the alloy. For example, an alloy of solder which is made from a composition of 52% indium and 48% tin transitions from a solid state to a liquid state at a temperature of 118° C. Accordingly, by using the different physical properties of common solder wire alloys, the inventors advantageously achieve the sensing of different temperature levels to cause an open state in the fuse.

The following is provided as an example. Base 98 of FIGS. 9A, 9B, 10A and 10B may be made of a layer of epoxy and/or fiberglass, thereby forming a non-conducting material base. The width W (shown in FIG. 4A) of conductors 94 and 96 may be, for example, 0.150 inches. The width of base 98 may be slightly wider, for example 0.175 inches. The thickness T for the two conductors (shown in FIG. 5B) may be, for example, 0.125 inches. The width and thickness of conductors 94 and 96 may be determined based on the RMS value of electrical current needed for a specific capacitor design.

The width of spring 100 may be the same as the width W of conductors 94 and 96. The thickness of spring 100 may be the same as the thickness T of the two conductors. The thickness of spring 100 may also be predetermined to have another fixed thickness T that depends on the amount of spring force desired to be stored into spring 100 when it is in a closed position (FIG. 10B).

Although the invention is illustrated and described herein with reference to specific embodiments, the invention is not intended to be limited to the details shown. Rather, various modifications may be made in the details within the scope and range of equivalents of the claims and without departing from the invention.

TABLE

Some Physical Properties of Common Solder Wire Alloys Provided by Indium Corporation of America ®

| Liquidus (° C./° F.) | Solidus (° C./° F.) | Indalloy ® Number | Composition (%) | Plastic Range (° C./° F.) | Mass Density (gm/cm³) | Electrical Cond. % of Cu) | Thermal Cond. w/cm° C. @ 85° C. | Thermal Coefficient of Expansion (ppm/° C.) @ 20° C. | Tensile Strength (PSI) | Bond Holding Strength (Shear) (PSI) |
|---|---|---|---|---|---|---|---|---|---|---|
| 118/244 | 118/244 | 1E | 52In48Sn | Eutectic | 7.30 | 11.70 | 0.34 | 20.0 | 1720 | 1630 |
| 138/281 | 138/281 | 281 | 58Bi42Sn | Eutectic | 8.56 | 4.50 | 0.19 | 15.0 | 8000 | 500 |
| 143/290 | 143/290 | 290 | 97In3Ag | Eutectic | 7.38 | 23.00 | 0.73 | 22.0 | 800 | — |
| 154/309 | 149/300 | 2 | 80In15Pb5Ag | 5/9 | 7.85 | 13.00 | 0.43 | 28.0 | 2550 | 2150 |
| 157/315 | 157/315 | 4 | 100In | Melting Point | 7.31 | 24.00 | 0.86 | 29.0 | 273 | 890 |
| 167/333 | 154/309 | 9 | 70Sn18Pb12In | 13/24 | 7.79 | 12.20 | 0.45 | 24.0 | 5320 | 4190 |
| 175/347 | 165/329 | 204 | 70In30Pb | 10/18 | 8.19 | 8.80 | 0.38 | 28.0 | 3450 | — |
| 179/354 | 179/354 | Sn62 | 62Sn36Pb2Ag | Eutectic | 8.41 | 11.90 | 0.50 | 27.0 | 7000 | 7540 |
| 181/358 | 173/343 | 205 | 60In40Pb | 8/15 | 8.52 | 7.00 | 0.29 | 27.0 | 4150 | — |
| 183/361 | 183/361 | Sn63 | 63Sn37Pb | Eutectic | 8.40 | 11.50 | 0.50 | 25.0 | 7500 | 6200 |
| 210/410 | 184/363 | 7 | 50In50Pb | 26/47 | 8.86 | 6.00 | 0.22 | 27.0 | 4670 | 2680 |
| 221/430 | 221/430 | 121 | 96.5Sn3.5Ag | Eutectic | 7.36 | 16.00 | 0.33 | 30.2 | 5620 | — |
| 232/450 | 232/450 | 128 | 100Sn | Melting Point | 7.28 | 15.60 | 0.73 | 24.0 | 1900 | — |
| 260/500 | 240/464 | 10 | 75Pb25In | 20/36 | 9.97 | 4.60 | 0.18 | 26.0 | 5450 | 3520 |
| 280/536 | 280/536 | 182 | 80Au20Sn | Eutectic | 14.51 | — | 0.57 | 16.0 | 40000 | 40000 |

What is claimed:

1. A capacitor having a large current carrying capacity comprising
   a hollow core formed by a non-conducting tubular section,
   a capacitor winding wrapped around the tubular section, and
   a thermal cutoff device disposed within the hollow core,
   wherein the thermal cutoff device is configured to sense a predetermined temperature level within the hollow core and disable the current carrying capacity of the capacitor,
   the thermal cutoff device includes first and second conductors electrically connected to each other with a predetermined solder alloy,
   the first conductor includes a rest state that occurs after being subjected to a springing force in a lateral direction away from the second conductor,
   the first conductor forms an angle of A degrees with respect to the second conductor during the rest state,
   the first conductor is disposed on top of a spring for biasing the first conductor away from the second conductor,
   an end portion of the first conductor extends beyond an end portion of the spring for connecting the end portion of the first conductor directly to the second conductor, and
   the first conductor, the second conductor, and the spring are each separate elongated planar strips.

2. The capacitor of claim 1 wherein
   the thermal cutoff device is disposed at a hot spot of the capacitor winding, the hot spot defined as a location of a high thermal energy within the capacitor winding.

3. The capacitor of claim 1 wherein
   the thermal cutoff device is disposed at a hot spot of the capacitor winding, the hot spot defined as a location of highest thermal energy within the capacitor winding.

4. The capacitor of claim 1 wherein
   the first conductor includes a cross-sectional portion attached to the second conductor, and the cross-sectional portion is subjected to a springing force in a lateral direction away from the second conductor.

5. The capacitor of claim 4 wherein
   the solder alloy includes a composition of one or more substances selected to melt at the predetermined temperature level, and
   upon melting of the solder alloy, the springing force moves the cross-sectional portion away from the second conductor.

6. The capacitor of claim 5 wherein
   the composition of the solder alloy and an amount of the springing force are selected for moving the first conductor away from the second conductor at the predetermined temperature level.

7. The capacitor of claim 4 wherein
   the solder alloy is disposed at the cross-sectional portion.

8. The capacitor of claim 4 wherein
   the capacitor winding includes metallic opposing ends,
   the first and second conductors are coupled to respective wire leads,
   one of the wire leads is connected, at a location external to the hollow core, to one of the metallic opposing ends, and the other wire lead is extended beyond the hollow core for attachment to a terminal, and
   lengths of the respective wire leads are adjusted to place the thermal cutoff device at the geometric center of the capacitor winding.

9. The capacitor of claim 4 wherein
   the thermal cutoff device includes a non-conducting base for fastening the first and second conductors directly on top of the non-conducting base, and the angle A is formed between the non-conducting base and the first conductor during the rest state.

10. The capacitor of claim 1 wherein the first and second conductors are formed from beryllium copper.

11. A capacitor having a large current carrying capacity comprising
    a hollow core formed by a non-conducting tubular section,
    a capacitor winding wrapped around the tubular section,
    a thermal cutoff device disposed within the hollow core and configured to sense a predetermined temperature level within the hollow core and disable the current carrying capacity of the capacitor,
    the thermal cutoff device including first and second conductors electrically connected to each other with a predetermined solder alloy,
    the first conductor disposed on a spring for biasing the first conductor away from the second conductor, and
    the first conductor and the spring are separate elements, wherein the first conductor includes a rest state resulting from the spring biasing the first conductor to a position away from the second conductor, and upon sensing the predetermined temperature level, the solder alloy is configured to melt and the spring is configured to bias the first conductor away from the second conductor and disable the current carrying capacity of the capacitor the first conductor, the second conductor and the spring are each elongated planar strips, the planar strip of the first conductor is disposed on top of the planar strip of the spring, an end portion of the planar strip of the first conductor extends beyond an end portion of the planar portion of connecting to planar strip of the second conductor, and the planar strips of the spring and the second conductor, respectively, are disposed on top of a non-conducting base.

12. The capacitor of claim 11 wherein
the spring is formed from beryllium copper for providing biasing to the spring.

13. The capacitor of claim 11 wherein
a strap is provided at a distance from the end portion of the planar strip of the first conductor for fixing the first conductor, the spring and the non-conducting base to each other, and when the first conductor is biased to the rest state, an angle is formed between the spring and the non-conducting base having a vertex at the strap.

14. The capacitor of claim 13 wherein
another strap is provided at another distance from an end portion of the planar strip of the second conductor for fixing the second conductor to the non-conducting base.

15. The capacitor of claim 11 wherein the first and second conductors are formed from beryllium copper.

* * * * *